United States Patent
Jackson et al.

(10) Patent No.: US 6,767,606 B2
(45) Date of Patent: Jul. 27, 2004

(54) VENTED CELL STRUCTURE AND FABRICATION METHOD

(75) Inventors: Dana B. Jackson, Broken Arrow, OK (US); Ronald Eugene Miller, Catoosa, OK (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/230,623

(22) Filed: Aug. 29, 2002

(65) Prior Publication Data

US 2004/0126537 A1 Jul. 1, 2004

(51) Int. Cl.[7] .................................................. B32B 3/12
(52) U.S. Cl. .................... 428/118; 428/73; 428/116; 428/131; 428/593; 156/60; 156/290; 156/291; 156/285; 156/250; 156/268; 156/295
(58) Field of Search ........................... 428/73, 116, 117, 428/118, 131, 593; 156/60, 285, 290, 291, 250, 268, 295

(56) References Cited

U.S. PATENT DOCUMENTS

| | | |
|---|---|---|
| 3,533,894 A | 10/1970 | Engelbrecht et al. |
| 3,895,152 A | 7/1975 | Carlson et al. |
| 4,803,108 A | 2/1989 | Leuchten et al. |
| 5,180,619 A | 1/1993 | Landi et al. |
| 5,270,092 A | 12/1993 | Griffith et al. |
| 5,460,865 A | 10/1995 | Tsotsis |
| 5,500,270 A | 3/1996 | Langdon et al. |
| 5,804,030 A | * 9/1998 | Jaegers et al. |
| 6,117,520 A | * 9/2000 | Wielinga et al. |

* cited by examiner

*Primary Examiner*—Deborah Jones
*Assistant Examiner*—Wendy Boss
(74) *Attorney, Agent, or Firm*—Alston & Bird LLP

(57) ABSTRACT

The vented cell structure and fabrication method of the present invention provide an efficient and effective honeycomb structure that allows fluids to flow in and out of the honeycomb without any obstructions that may trap gases and/or liquid in the honeycomb cells. First and second honeycomb layers, including first and second cell walls, respectively, that define first and second cells, respectively, are positioned adjacent one another such that the first and second cells are misaligned. The first and second honeycomb layers are connected with adhesive only at intersections of the first and second cell walls to permit fluid to flow between the first and second cells without obstruction. A structural layer defining at least one opening aligned with the first and/or second cells is also applied on opposite sides of the first and second honeycomb layers, to thereby create the vented cell structure.

22 Claims, 4 Drawing Sheets

US 6,767,606 B2

VENTED CELL STRUCTURE AND FABRICATION METHOD

BACKGROUND OF THE INVENTION

This invention relates to a vented cell structure and, more particularly, to a vented cell structure that permits the rapid dissipation of pressure differentials between the cell structure and the surrounding environment.

Cellular or honeycomb cores (hereinafter, honeycomb) are utilized in various applications to provide lightweight, but relatively strong structural support. For example, honeycomb is used, typically in the body structure, of automobiles, tractor-trailers, and other land vehicles, in addition to the body structure of aircraft, spacecraft, and other air vehicles. In particular, honeycomb is used in aircraft flaps, wing-to-body fairings, nacelles, radomes, doors, floors, ceilings, stow bins and walls, and in the internal sandwich structure in cryogenic tanks. For instance, honeycomb structures are used in the wing forward, leading edge wing panels, and from the tip of the wing to the fuselage in the Boeing 747 aircraft.

Honeycomb is made of multiple cell walls that define multiple cells. The cell walls are typically made of metallic and/or nonmetallic material. Many types of honeycomb are made of cellulose material. One example of a nonmetallic material used to make honeycomb is NOMEX®, commercially available from E.I. du Pont de Nemours and Company, Inc., which is formed of resin impregnated fibers that provide not only the necessary lightweight and high-strength characteristics, but also thermal protection. In addition, the cell walls of the honeycomb may be arranged in various configurations include, hexagonal, overexpanded, and flexible core, each having different cell geometry similar to a hexagon shape.

Honeycomb panels typically include load carrying or structural layers on opposite sides of the honeycomb cellular structure. The structural layers are usually made of structural fiber reinforced composite material or a metallic material. The honeycomb is typically attached to the structural layers with an adhesive material applied between the edges of the cell walls of the honeycomb and the structural layer. The resulting honeycomb panel is then capable of withstanding significant in-plane, bending and shear loads.

When the honeycomb panel is subject to repeated changes in temperature and pressure, however, the advantages of the honeycomb panel may be reduced.

For example, in the aircraft industry, the honeycomb panel in the wings of an aircraft contains air, and the pressure and temperature of the air changes to be in equilibrium with the outside atmosphere. Thus, the air in the honeycomb panel experiences repeated changes in pressure and temperature between the time when the aircraft is in flight and the time when the aircraft is on the ground. When the aircraft is on the ground, the cells of the honeycomb are in equilibrium with the temperature and pressure of the air on the ground. When the altitude of the aircraft increases, however, the pressure and temperature of the atmosphere decreases. The pressure and temperature of the air in the wing and in the honeycomb panel also decrease and eventually become substantially equal to the lower pressure and temperature of the atmosphere at the increased altitude. In this regard, air generally gradually leaks from the honeycomb panel, such as though the cell walls and structural layers to equalize the pressure. When the aircraft returns to the ground, the pressure and temperature of the atmosphere are greater than the pressure and temperature of the air in the honeycomb panel, such that the air in the wing and honeycomb panel must increase in pressure and temperature in order to equalize with the outside atmosphere. For example, air again generally leaks through the honeycomb panel to increase the internal pressure. The increase in air pressure and temperature causes water to condense within and on the outside of the honeycomb panel. The water on the outside of the honeycomb panel may eventually migrate through the structural layers, which adds to the moisture inside the honeycomb. The next time the aircraft is in flight and subjected to an atmosphere at a lower pressure and temperature, at least some of the water may evaporate, but over time, some water will get trapped in the honeycomb material because it may take longer for the water to evaporate than the time that the aircraft is in the lower temperature and pressure atmosphere. The cell walls of the honeycomb material will eventually absorb the water, which makes evaporation of the water an even more lengthy process. The water in the honeycomb material then makes the honeycomb panel heavier and causes the honeycomb panel to lose its structural integrity.

Honeycomb material in a honeycomb panel that has absorbed water, therefore, may occasionally be replaced with new honeycomb material. In the aircraft industry, replacing the honeycomb material consists of several hours of labor because the segment of the aircraft with the damaged honeycomb material must be taken apart, the damaged honeycomb material removed, new honeycomb material installed, and the segment of the aircraft rebuilt. Thus, the aircraft must be taken out of service and significant amounts of labor and time must be expended to replace the honeycomb panel, which is costly.

Attempts to eliminate the moisture collection in honeycomb panels have focused on eliminating the pressure and temperature differential between the interior of the honeycomb panel and the exterior of the panel. In order to eliminate the pressure and temperature differential, the entrapped air characteristic of honeycomb panels must be mitigated to allow the air within the honeycomb panel to equalize with the air outside the honeycomb panel immediately instead of slowly, which causes the pressure differential that promotes moisture accumulation. Without the pressure and temperature differential caused by air at one temperature and pressure being trapped in the honeycomb panels and air at another temperature and pressure outside of the panel, moisture does not get trapped in the honeycomb panel, which extends the life of the honeycomb material because the honeycomb material will not have to be replaced due to moisture problems.

Existing techniques for allowing fluids to flow in and out of the honeycomb panel without obstruction consist of perforating the cell walls of the honeycomb material. For instance, honeycomb material with pre-perforated cell walls is available, such as that commercially available from Hexcel, Inc. The pre-perforated honeycomb material, however, is expensive. Another technique requires drilling through standard, non-perforated honeycomb material with a long drill bit from a side of the sandwich panel in order to puncture each cell wall. This technique permits the flow of fluid in and out of the honeycomb, but the drilling operation is time-consuming and expensive. In addition, the drilled holes in the honeycomb cells may reduce the structural integrity of the honeycomb panel.

In addition, the honeycomb panel may be formed of staggered layers of honeycomb materials in which two or more honeycomb layers are positioned side-by-side in an offset manner such that the cellular structure of the honeycomb panels is somewhat staggered. This honeycomb layered structure may also include perforated sheet(s) of polyester, polyvinylchoride, polyethylene, polypropylene, and polystyrene between adjacent honeycomb layers. The structural layers on the outer surface of the honeycomb panel also may define holes, at least some of which are aligned with the cells of the internal honeycomb material. This honeycomb layered structure configuration, however, does not permit the unobstructed flow of fluid between the cells of the staggered honeycomb because the perforated sheets between the cells may continue to trap at least some air within the honeycomb cells. As such, the temperature and pressure differentials may not dissipate as quickly as necessary to prevent moisture from forming.

Therefore, a need exists for a vented honeycomb structure that effectively and efficiently allows fluids to flow in and out of the honeycomb panel without any obstructions that may trap gases and/or liquid in the honeycomb cells. The vented honeycomb structure should be inexpensive to fabricate, but also continue to provide the necessary strength to withstand the in-plane, bending, and shear loads that the honeycomb panel will experience in a specific application.

BRIEF SUMMARY OF THE INVENTION

The vented cell structure and fabrication method of the present invention provide a multilayer, vented honeycomb structure without obstructions in or around the honeycomb cells that may trap gases and/or liquids, such that fluids may freely flow in and out of the honeycomb panel. Thus, because gases and/or liquids cannot be trapped in the honeycomb cells, the honeycomb cells do not suffer from the detrimental effects that occur when moisture is trapped within the honeycomb material that may lead to replacement of the honeycomb material. For example, in the aircraft industry, the vented cell structure of the present invention decreases the repair/replacement costs associated with an aircraft because it prevents having to take the aircraft out of service in order to replace the honeycomb panels due to moisture damage. In addition, the vented cell structure of the present invention is inexpensive to fabricate, but provides the necessary strength to withstand in-plane, bending and shear loads that the honeycomb panels experiences in specific applications.

The vented cell structure of the present invention includes adjacent and connected first and second honeycomb layers having a plurality of first cell walls and second cell walls, respectively. The first and second cell walls, in turn, define a plurality of first cells and second cells, respectively. The first and second honeycomb layers are positioned such that the first and second cells are misaligned. For instance, the first honeycomb layer may be rotated relative to the second honeycomb layer. In a specific embodiment of the vented cell structure of the present invention, the first honeycomb layer is rotated ninety-degrees relative to the second honeycomb layer. Furthermore, after positioning the first and second honeycomb layers appropriately, pressure may be applied to the first and/or second honeycomb layer such that the edges of at least one of the first and second cell walls partially cut into one another, thereby fixing the first and second honeycomb layers in position relative to one another.

Various embodiments of the vented cell structure of the present invention include the first cells having the same shape and size or a different shape and size than the second cells. The first and/or second honeycomb layers may include a hexagonal, overexpanded and/or flexible honeycomb cell configuration. In addition, the first and/or second honeycomb layer may be made of a metallic material or a composite material.

The first and second honeycomb layers are connected only at intersections of the first and second cell walls. The intersections are the points where the first and second cell walls are in contact, whether one of the first and second cell walls is partially cut into the other or not. As such, the fluid can flow without obstruction between the first and second cells. To connect the first and second honeycomb layers, adhesive may be applied between the first and second honeycomb layers on only the first and second cell walls. Thus, the adhesive does not create any obstruction between the first and second cells, and fluid may freely flow between the first and second cells. The adhesive may be reticulated unsupported film adhesive. To apply the reticulated adhesive, unsupported reticulating film adhesive may be laid on the first and second honeycomb layers, and the adhesive may then be heated to draw the adhesive to the first and second cell walls. The resulting adhesive is therefore located on only the first and second cell walls, and does not create any obstruction between the first and second cell walls.

The first and second honeycomb layers may also be bonded to one another after properly positioning the first and second honeycomb layers relative to each other as described above. Bonding the first and second honeycomb layers includes applying pressure to the first and/or second honeycomb layer in a direction that is normal to a major surface of the first and/or second honeycomb layer, then heating the first and second honeycomb layers. Pressure may be applied to the first and second honeycomb layers by encasing the first and second honeycomb layers, and removing the air from the encasement. Encasing the first and second honeycomb layers may include placing a film, such as a nylon film, on an outward facing surface of the first and/or second honeycomb layer. When the air is removed from the encasement, the film may be in contact with the outward facing side(s) of the first and/or second honeycomb layer, such that the film applies pressure to the first and/or second honeycomb layer. Thus, the pressure applied to the first and/or second honeycomb layers holds the honeycomb layers in position as they are heated in order to bond the honeycomb layers to one another.

The vented cell structure also includes a structural layer that may be applied on opposite sides of the first and second honeycomb layers. The structural layers may be bonded to the honeycomb layers at the same time the honeycomb layers are bonded together or the structural layers may be adhered to the already bonded honeycomb layers. In a particular embodiment of the vented cell structure of the present invention, the structural layers are made of structural fiber reinforced composite material, such as fiberglass/epoxy or carbon fiber/epoxy, or a metallic material, such as aluminum or titanium. The structural layers also define at least one opening aligned with a first cell and/or a second cell. At least one opening may be defined in the structural layers prior to or subsequent to applying the structural layers on opposite sides of the first and second honeycomb layers. Thus, the resulting vented cell structure allows fluid to flow between the first and second cells without obstruction, and the fluid can also freely flow into and out of the first and second cells through the opening(s) in the structural layers, thereby reducing the possibility of moisture accumulating within the honeycomb material and causing damage.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The vented cell structure and method of fabricating a vented cell structure of the present invention provide a cell structure, i.e., a honeycomb panel that permits the unobstructed flow of fluids between, into and out of the honeycomb cells. The free flow of fluids through the honeycomb panel prevents moisture from becoming trapped in the honeycomb cells, which can damage the honeycomb material by degrading the structural integrity of the honeycomb material and by adding unwanted weight to the honeycomb panel. Because honeycomb panel construction is typically utilized in various applications, such as in air and land vehicles, due to its advantageous high strength relative to its low weight, damaged honeycomb panels are generally replaced, which may be an expensive and time-consuming process. Thus, the vented cell structure and associated fabrication method of the present invention prevent fluids from becoming trapped within the honeycomb panel, which keeps moisture from accumulating within the honeycomb material and, therefore, reduces the expense and labor involved in replacing honeycomb structures.

Figure 1:
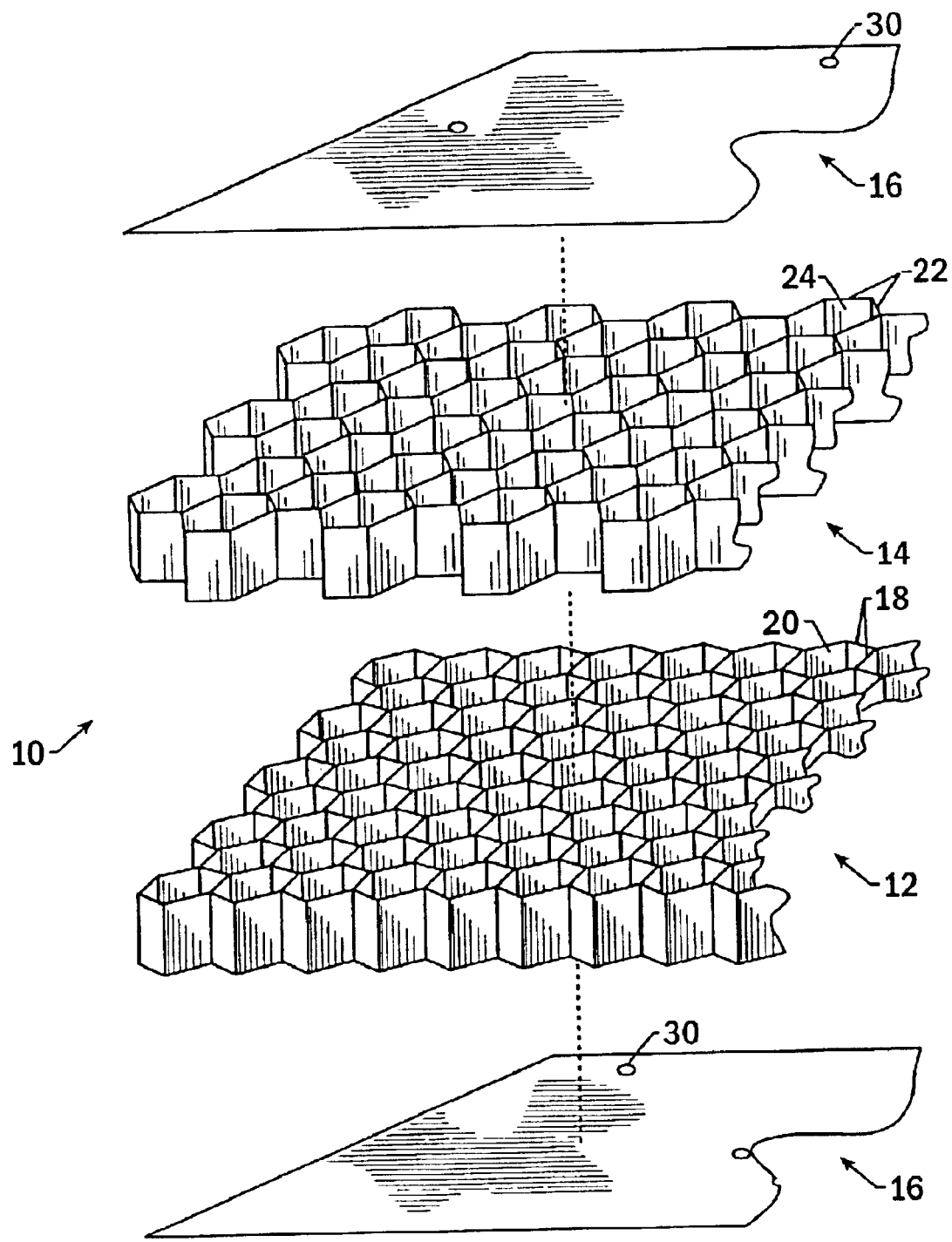
FIG. 1 is an exploded view of the vented cell structure according to one embodiment of the present invention.

FIG. 1 illustrates an exploded view of a vented cell structure 10 according to one embodiment of the present invention. The vented cell structure 10 includes a first honeycomb layer 12 and a second honeycomb layer 14. In addition, a structural layer 16 is located on each of the opposite, sides of the first and second honeycomb layers 12, 14. The structural layers 16 may be located on the outermost side of the honeycomb panel, or there may be additional layer(s) of materials, or coating(s) on the outward facing side(s) of the structural layers.

The first honeycomb layer 12 is made of first cell walls 18 that define first cells 20. The second honeycomb layer 14 is made of second cell walls 22 that define second cells 24. The first and second honeycomb layers 12, 14 may be any type of honeycomb material known to those skilled in the art. Although the honeycomb layers may be pre-perforated, the honeycomb layers are preferably not pre-perforated because pre-perforated layers may decrease the structural integrity of the honeycomb layers. In addition, because the honeycomb layers are not pre-perforated, the honeycomb panel is less expensive than those honeycomb panels made with pre-perforated honeycomb layers.

The first and second cell walls 18, 22 may be made of any type of appropriate material, metallic or non-metallic. Examples of typical non-metallic materials used for the first and/or second cell walls 18, 22 are cellulose materials and composite materials. A typical cellulose material is NOMEX® honeycomb, commercially available from E.I. du Pont de Nemours and Company, Inc., which is formed of resin impregnated cellulose fibers that provide not only the necessary lightweight and high-strength characteristics, but also thermal protection. The composite materials are typically structural fiber reinforced composite materials, in which the fibers are embedded in a plastic resin. First and second cell walls 18, 22 may be made of the same material or they may be made from different materials, depending upon the requirements of the specific application of the vented cell structure 10. Furthermore, the thickness of the first cell walls 18 may be greater than, less than or equal to the thickness of the second walls 22.

The cell walls 18, 22 may be arranged in various configurations to create various sizes and shapes of cells 20, 24, respectively. Some examples of cell wall, i.e., honeycomb, configurations include, hexagonal, overexpanded, and flexible cell shape. In addition, although cells 20 have the same hexagonal shape and size as cells 24 in the illustrated embodiment, other embodiments may include cells 20 having a different shape and/or size than cells 24. Moreover, even the cells within a single panel may differ in size from other cells in the same honeycomb panel.

Figure 2A:
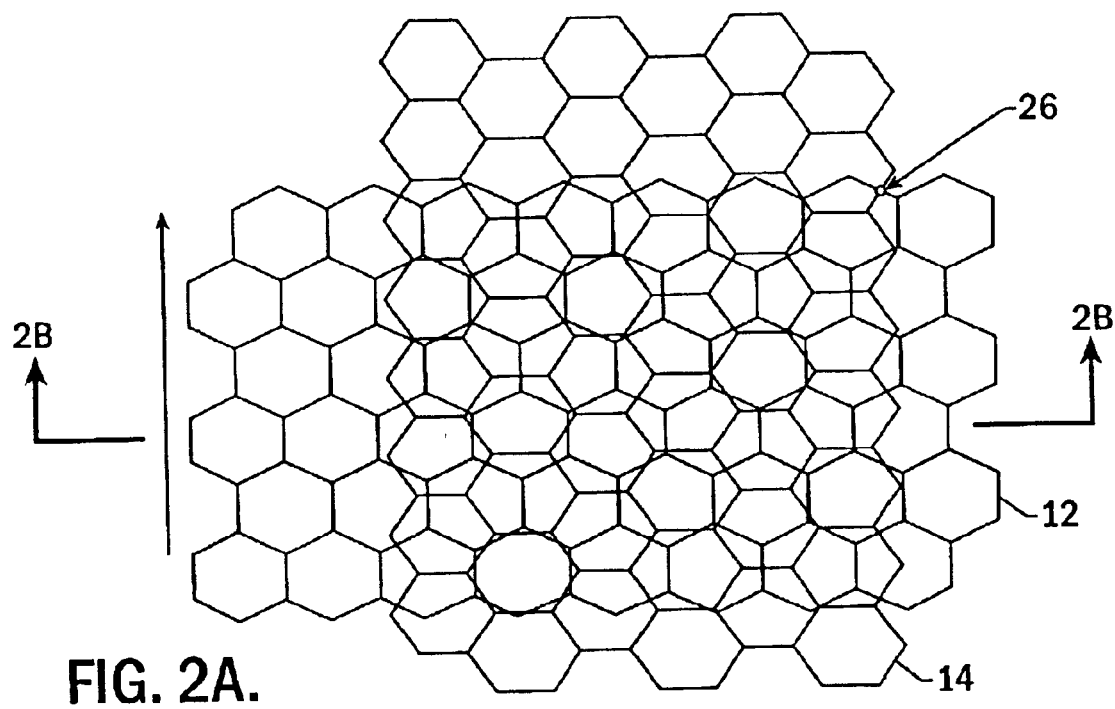
FIG. 2A is a perspective view of the misalignment of the first and second cells of the first and second honeycomb layers, respectively, according to one embodiment of the present invention.

FIG. 2A illustrates how the first honeycomb layer 12 and the second honeycomb layer 14 are positioned relative to one another, according to one embodiment of the present invention. Thus, the first and second cell walls 18, 22 are positioned relative to each other such that first cells 20 and second cells 24 are misaligned. Furthermore, the first honeycomb layer 12 and second honeycomb layer 14 are connected only at the intersections 26 of the first and second cell walls 18, 22. Thus, in the resulting vented cell structure 10, there is no sheet, layer or any other type of material that completely or partially spans across the first and/or second cells 20, 24 between the first honeycomb layer 12 and the second honeycomb layer 14. As such, any type of fluid, such as any type of gas or liquid, may freely flow between the first and second cells 20, 24 without any obstruction.

Figure 2B:
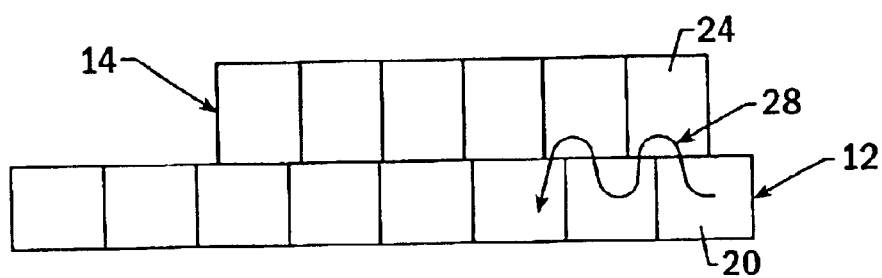
FIG. 2B is a cross-sectional view of the misalignment of the first and second cells of the first and second honeycomb layers, respectively, according to one embodiment of the present invention.

FIG. 2B depicts a cross-section at line A—A of first and second honeycomb layers 12, 14 positioned as shown in FIG. 2A. The purposeful misalignment of the first and second cells 20, 24 therefore results in a fluid flow path 28 between the first and second cells 20, 24. The fluid flow path 28 illustrates that fluid does not become trapped in any one cell of the vented cell structure 10, but, instead, is free to flow through the cells and even out of the cells as long as the outward facing surfaces of the first and second honeycomb layers 12, 14 are not completely sealed.

Figure 3:
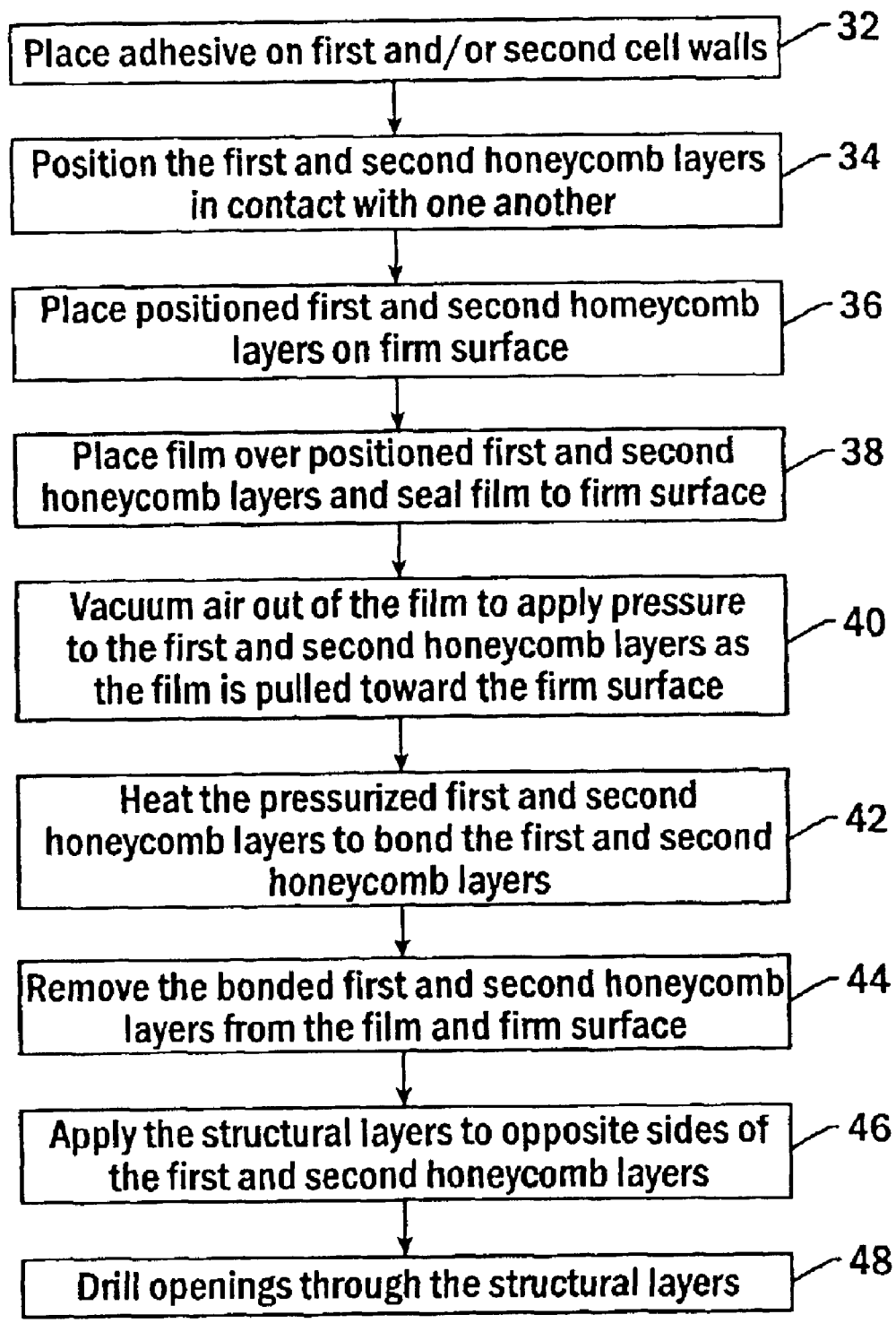
FIG. 3 is a flow diagram of a method of fabricating a vented cell structure according to one embodiment of the present invention.
Figure 4:
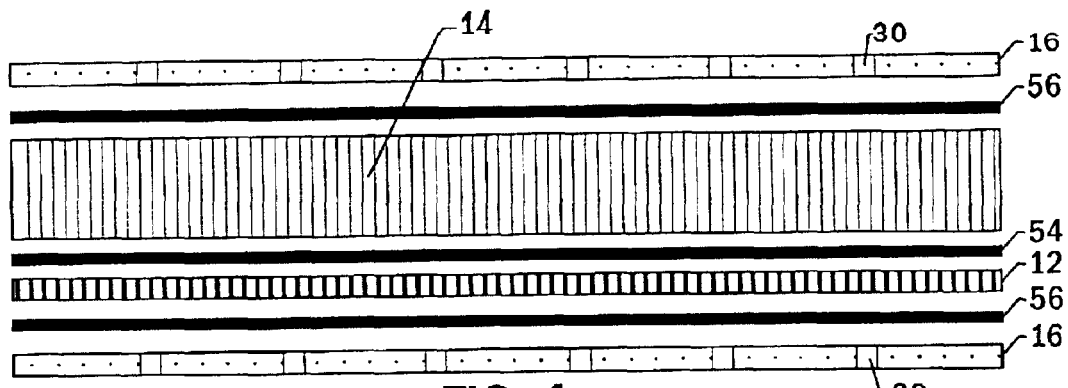
FIG. 4 is a cross-sectional, exploded view of a honeycomb panel of one embodiment of the present invention, illustrating the locations of the adhesive between the first and second honeycomb layers, and between the structural layers and the respective first and second honeycomb layers.

FIG. 3 represents one embodiment of a method used to fabricate a vented cell structure 10. The first honeycomb layer 12 and second honeycomb layer 14 may be connected with any type of adhesive known to those skilled in the art that will result in only the intersections 26 of the first and second cell walls 18, 22 being connected. As represented by step 32, the adhesive is placed on the first and/or second cell walls 18, 22 and, more particularly, upon the edges of the cell walls that face the other panel. FIG. 4 illustrates the location of adhesive 54 between the first and second honeycomb layers 12, 14. The adhesive may be applied directly to the first and second cell walls 18, 22 or it may be drawn to the first and second cell walls 18, 22 by reticulation. Thus, in one embodiment of the present invention, the adhesive may be an unsupported epoxy film adhesive, such as FM-300, commercially available from Cytec Canada Inc., BOSSARD, QUEBEC. The unsupported epoxy film adhesive may be laid on the surface(s) of at least one of the first and second cell walls 18, 22 to be connected to one another. Before positioning the first and second honeycomb layers 12, 14 such that the surfaces to be connected are touching, each honeycomb layer that supports the film adhesive is heated to reticulate the adhesive and cause the adhesive to be drawn to the first and/or second cell walls 18, 22. As such, the adhesive is located on the first and/or second cell walls 18, 22 only and the first and second cells 20, 24 are unobstructed. Once the adhesive is reticulated, it becomes tacky and the first and second honeycomb layers 12, 14 may be positioned with the adhesive covered surface(s) or edges of the first and/or second honeycomb layers 12, 14 facing one another, as represented by step 34.

Figure 5:
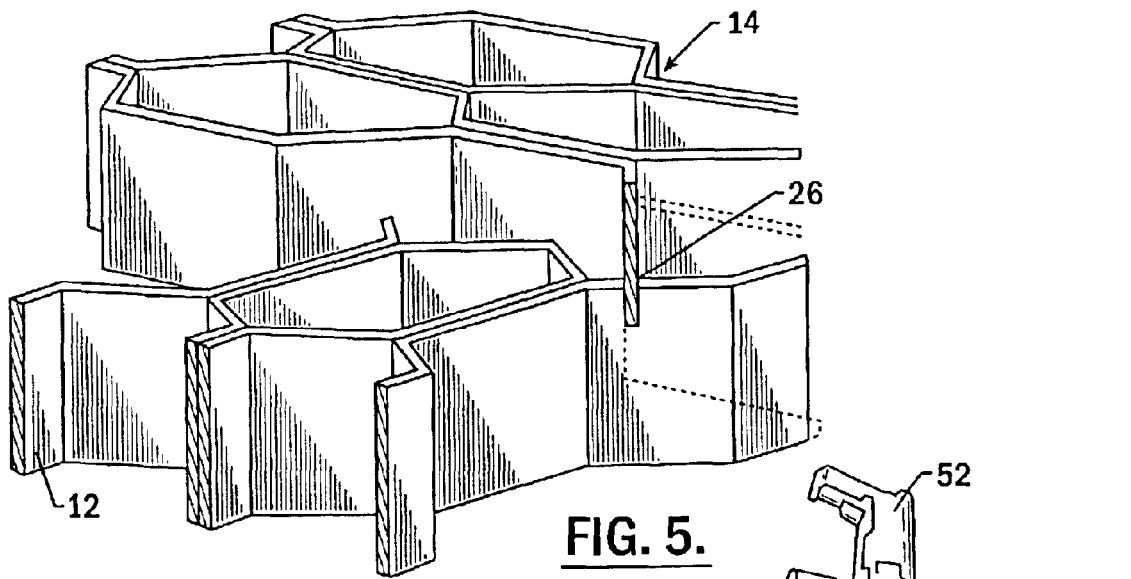
FIG. 5 is a perspective view depicting the cells of the first and second honeycomb layers being cut into one another according to one embodiment of the present invention.

As described above, the first and second honeycomb layers 12, 14 are positioned such that the first and second cells 20, 24 are misaligned. To misalign the first and second cells 20, 24, particularly when the first and second cells 20, 24 are the same size and shape, the first honeycomb layer 12 may be rotated relative to the second honeycomb layer 14. In a specific embodiment, the first honeycomb layer 12 may be rotated ninety degrees relative to the second honeycomb layer 14. The first and second honeycomb layers 12, 14 may be touching on only the edges of the cell walls 18, 22 at the intersections 26. Alternatively, enough pressure may be applied to the first and/or second honeycomb layers 12, 14, such that at least one of the edges of the first cell walls 18 partially cut into the second cell walls 22 and/or at least one of the edges of the second cell walls 22 partially cut into the first cell walls 18. FIG. 5 illustrates an embodiment of first and second honeycomb layers 12, 14 partially cut into one another at the intersections 26.

After positioning the first and second honeycomb layers 12, 14, whether partially cut into one another or not, the first and second cell walls 18, 22 may be bonded together at the intersections 26 by any process known to those skilled in the art. One example of a process for bonding the first and second honeycomb layers 12, 14 includes placing the positioned first and second honeycomb layers 12, 14 on a firm surface, such as a plate-shaped tool, and is represented by step 36. The firm shape may be flat or any other shape, such as contoured, depending upon the desired final honeycomb panel shape, as may be required by the particular application of the resulting honeycomb panel. The surface may be made of any appropriately firm material, metallic or nonmetallic.

A film may be placed over the first and second honeycomb layers 12, 14. The film may be made of any air-tight and pliable material, such as nylon. The film is sealed to the firm surface, except for an opening where a vacuum source may be attached, to form a film and firm surface encasement. These activities are represented by step 38 of FIG. 3. Alternatively, the film may completely encase the first and second honeycomb layers 12, 14, except for the vacuum opening. In this alternative embodiment, the film may therefore be a bag. The vacuum source may be in communication with the opening in order to remove air from the encasement. As the air is removed, the film is pulled toward the firm surface or toward the opposite side of the film and, therefore, applies pressure to the first and second honeycomb layers 12, 14, as represented by step 40. The amount of pressure applied is enough to firmly hold the first and second honeycomb layers 12, 14 in position and nested to the firm surface or to each other when completely encapsulated by the film, but not so much that the edges of the cell walls 18, 22 will cut into one another as described above. In addition, if the edges of the cell walls 18, 22 are already partially cut into one another, the pressure applied by the film is not so much that the edges of the cell walls 18, 22 will cut further into one another.

While the pressure is being applied, the first and second honeycomb layers 12, 14 are heated to a temperature that will bond first and second honeycomb layers 12, 14 together with the adhesive, as represented by step 42. For example, the first and second honeycomb layers 12, 14 in the encasement made of the firm surface and nylon film may be placed in an autoclave at 250 to 300 degrees Fahrenheit for approximately one hour in order to sufficiently bond the first and second honeycomb layers 12, 14 via the reticulated adhesive. Once the first and second honeycomb layers 12, 14 are bonded together, the first and second honeycomb layers 12, 14 may be removed from the encasement by removing the film from the firm surface and lifting the first and second honeycomb layer structure from the film surface, as represented by step 44. As will be apparent to those skilled in the art, the first and second honeycomb layers may be adhered in other fashions and by other adhesives, including adhesives that cure or set at room temperature.

The vented cell structure 10 of the present invention also includes structural layers 16 that are typically located on opposite, outward-facing sides of the first and second honeycomb layers 12, 14. Embodiments of the structural layers 16 are illustrated in FIGS. 1 and 4. The adhesive between the first and second honeycomb layers, and between the structural layers and the respective first and second honeycomb layers is shown in FIG. 4, but is left out of FIG. 1 for clarity. The structural layers 16 provide structural stabilization for the first and second honeycomb layers 12, 14 that are formed from first and second cell walls 18, 22. Thus, the structural layers 16 may be made of any type of material that is capable of providing the necessary strength, while not adding too much weight to the vented cell structure 10 for the particular application. For instance, the structural layers 16 may be made of structural fiber reinforced metallic material. In the structural fiber reinforced composite material, the fibers are embedded in a plastic resin. Examples of the fibers include, but are not limited to, carbon, fiberglass, and/or quartz, and the examples of the resin include, but are not limited to epoxy, and/or polimid. The honeycomb material may further be made of a metallic material, which may include, but is not limited to, aluminum and titanium.

To apply the structural layers 16 to the opposite sides of the first and second honeycomb layers 12, 14, as represented by step 46 of FIG. 3, the structural layers 16 may be positioned on and connected to first and second honeycomb layers 12, 14. Thus, the same or a different type of adhesive may be applied to the opposite edges of the cell walls 18, 22 of the first and second honeycomb layers 12, 14 as was applied to the inwardly facing edge(s) of the cell walls 18, 22 of the first and/or second honeycomb layers 12, 14, as described above. FIG. 4 illustrates the location of the adhesive 56 between the structural layers 16 and the respective honeycomb layer 12, 14. If unsupported reticulating epoxy adhesive is used to apply the structural layers 16 to the opposite edges of the first and second honeycomb layers 12, 14, then the process may be the same as that detailed above regarding the application of the adhesive to the first and/or second cell walls 18, 22. In addition, the adhesive-coated inner edge of the first and/or second cell walls 18, 22 may then be bonded to the structural layers 16, as also described above regarding the bonding of the first and second cell walls 18, 22, including, for example, the application of pressure by means of a film or bag at elevated temperatures. Alternatively, any other type of appropriate adhesive may be applied to edges of the cell walls 18, 22 and/or the structural layers 16 that will sufficiently attach the structural layers 16 to the cell walls 18, 22, without obstructing the opening(s) 30 to the first and/or second cells 20, 24. Alternatively, uncured structural layers 16 may be positioned on opposite sides of the first and second honeycomb layers at the time when the first and second honeycomb layers are positioned in contact with one another. Adhesive is placed between the uncured structural layers and the respective first and second honeycomb layers. One of the structural layers is positioned on the firm surface, with the rest of the layers and adhesive positioned on the structural layer, ending with the other structural layer. The entire panel is then bonded together as described hereinabove, with respect to steps 38 to 44 of FIG. 3.

The structural layers 16 define at least one opening 30 aligned with the first and/or second cells 20, 24. The opening(s) 30 may be defined in the structural layers 16 before or after applying the structural layers 16 to the opposite sides of the first and second honeycomb layers 12, 14. Alternatively, if the structural layers define two or more openings 30, at least one of the openings 30 may be defined before applying the structural layers 16 to the opposite sides of the first and second honeycomb layers 12, 14, and at least one more of the openings 30 may be defined after applying the structural layers 16 to the opposite sides of the first and second honeycomb layers 12, 14.

Figure 6:
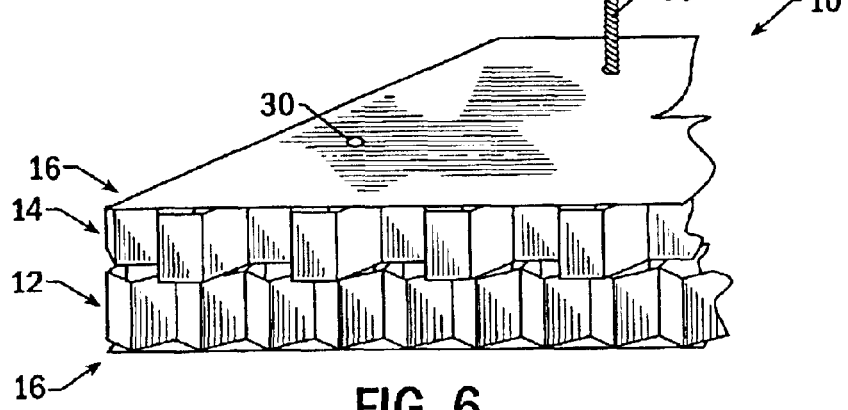
FIG. 6 is a perspective view of a drilling tool and drill bit used to form openings in the structural layers of the vented cell structure according to one embodiment of the present invention.

The opening(s) 30 may be defined in the structural layers 16 by any manner known to those skilled in the art, such as by drilling through the appropriate portions of the structural layers 16, as represented by step 48 of FIG. 3. In addition, whether the openings are defined in the structural layers 16 before and/or after applying the structural layers 16 to the opposite sides of the first and second honeycomb layers 12, 14, each structural layer 16 may be drilled separately or both of the structural layers 16 may be drilled in the same motion. Thus, if the structural layers 16 are drilled in the same motion after the structural layers 16 have been applied to the opposite sides of the first and second honeycomb layers 12, 14, as shown in FIG. 6, the drill bit 50 of the drilling tool 52 used to drill the openings 30 is long enough to span through the first and second cells 20, 24 and the width of the structural layers 16. The size of the openings 30 is sufficient to permit fluid to freely flow into and out of the first and second cells 20, 24, while also maintaining the structural support that is necessarily provided by the structural layers 16.

Thus, the configuration of the first and second honeycomb layers 12, 14, along with the structural layers 16, provide a vented cell structure having the strength necessary for most applications, while also allowing the free flow of fluid between, into and out of the first and second cells 20, 24. Thus, the fluid within the first and/or second cells 20, 24 will not become trapped within the cell structure. For example, when the vented cell structure 10 is utilized in an air vehicle application, the air within the first and/or second cells 20, 24 will have the same temperature and pressure as the outside atmosphere when the air vehicle is in flight or when the air vehicle lands because the free flow of fluid through, into and out of the first and second cells 20, 24 allows the temperature and pressure of the air within the first and second cells 20, 24 to immediately equalize to the outside atmosphere. Thus, air at a temperature and pressure that is different than that of the outside atmosphere temperature and pressure is not trapped within the first and/or second cells 20, 24, and therefore moisture is not trapped in the cells, which can be absorbed into the honeycomb material of honeycomb layers 12, 14 resulting in damage to the cell walls. Because the cells walls are not damaged by trapped moisture, the vented cell structure 10 of the present invention does not need to be replaced as often as conventional cell structures, which reduces the cost of utilizing such a cell structure. In addition, the strength of the vented cell structure of the present invention is capable of providing the lightweight and high-strength that is characteristic of conventional cell structures.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A vented cell structure, comprising:
    a first honeycomb layer comprising a plurality of first cell walls to define a plurality of first cells;
    a second honeycomb layer adjacent and connected to said first honeycomb layer and comprising a plurality of second cell walls to define a plurality of second cells, wherein said first honeycomb layer and said second honeycomb layer are positioned such that the plurality of first cells and the plurality of second cells are misaligned, wherein said first honeycomb layer is positioned at least partially in a separate plane than said second honeycomb layer, and wherein the first honeycomb layer and second honeycomb layer are connected only at intersections of the plurality of first cell walls and the plurality of second cell walls without other obstruction between said first honeycomb layer and said second honeycomb layer, such that fluid can flow without obstruction between the plurality of first cells and the plurality of second cells; and
    a structural layer on opposite sides of said first honeycomb layer and said second honeycomb layer, wherein said structural layer defines at least one opening aligned with at least one of the first cells and at least one of the second cells, to thereby create the vented cell structure, wherein the plurality of first cell walls of said first honeycomb layer define the plurality of first cells having a different shape and size than the plurality of second cells defined by the plurality of second cell walls of said second honeycomb layer.

2. The vented cell structure of claim 1, wherein at least one of said first and second honeycomb layers comprises at least one of a hexagonal, overexpanded, and flexible core honeycomb cell configuration.

3. The vented cell structure of claim 1, wherein at least one of said first and second honeycomb layers is made of a metallic material.

4. The vented cell structure of claim 1, wherein at least one of said first and second honeycomb layers is made of composite material.

5. The vented cell structure of claim 1, further comprising adhesive between said first honeycomb layer and said second honeycomb layer on only the plurality of first cell walls and the plurality of second cell walls, such that fluid can flow between the plurality of first cells and the plurality of second cells without obstruction.

6. The vented cell structure of claim 5, wherein said adhesive is a reticulated unsupported film adhesive.

7. A vented cell structure, comprising:
a first honeycomb layer comprising a plurality of first cell walls to define a plurality of first cells;
a second honeycomb layer adjacent and connected to said first honeycomb layer and comprising a plurality of second cell walls to define a plurality of second cells, wherein said first honeycomb layer and said second honeycomb layer are positioned such that the plurality of first cells and the plurality of second cells are misaligned, wherein said first honeycomb layer is positioned at least partially in a separate plane than said second honeycomb layer, and wherein the first honeycomb layer and second honeycomb layer are connected only at intersections of the plurality of first cell walls and the plurality of second cell walls without other obstruction between said first honeycomb layer and said second honeycomb layer, such that fluid can flow without obstruction between the plurality of first cells and the plurality of second cells; and
a structural layer on opposite sides of said first honeycomb layer and said second honeycomb layer, wherein said structural layer defines at least one opening aligned with at least one of the first cells and at least one of the second cells, to thereby create the vented cell structure, wherein said first honeycomb layer is rotated ninety-degrees relative to said second honeycomb layer.

8. The vented cell structure of claim 7, wherein the plurality of first cell walls of the first honeycomb layer and the plurality of second cell walls of the second honeycomb layer define the respective plurality of first cells and the plurality of second cells, each having same shape and size.

9. The vented cell structure of claim 7, wherein said structural layer is made of structural fiber reinforced composite material.

10. The vented cell structure of claim 7, wherein said structural layer is made of metallic material.

11. A method of fabricating a vented cell structure, comprising:
providing a first honeycomb layer comprising a plurality of first cell walls to define a plurality of first cells, and a second honeycomb layer comprising a plurality of second cells walls to define a plurality of second cells;
applying an adhesive to at least one of the plurality of first cell walls and second cell walls;
positioning the first and second honeycomb layers in contact with one another without aligning the plurality of first cells and the plurality of second cells, wherein positioning the first and second honeycomb layers comprises at least partially positioning the first honeycomb layer in a separate plane than the second honeycomb layer, and wherein positioning the first and second honeycomb layers comprises adhesively connecting the first honeycomb layer and the second honeycomb layer only at intersections of the plurality of first cell walls and the plurality of second cell walls without other obstruction between said first honeycomb layer and said second honeycomb layer, such that fluid can flow without obstruction between the plurality of first cells and the plurality of second cells; and
applying a structural layer to the opposite sides of the first and second honeycomb layers, wherein the structural layer defines at least one opening aligned with at least one of the plurality of first cells and at least one of the plurality of second cells, wherein the adhesive is an unsupported reticulating film adhesive, and wherein applying the adhesive to the plurality of first cell walls and the plurality of second cell walls comprises laying the unsupported reticulating film adhesive on the first and second honeycomb layers, and heating the adhesive to draw the adhesive to the plurality of first and the plurality of second cell walls, such that the adhesive is located only on the plurality of first cell walls and the plurality of second cell walls.

12. The method of claim 11, further comprising bonding the first honeycomb layer to the second honeycomb layer after positioning the first and second honeycomb layers, wherein bonding comprises applying pressure to at least one of the first honeycomb layer and the second honeycomb layer in a direction that is normal to a major surface of the first and second honeycomb layers and heating the first and second honeycomb layers.

13. The method of claim 11, further comprising bonding the structural layer to opposite sides of the first and second honeycomb layers, and bonding the first honeycomb layer to the second honeycomb layer after applying the structural layer to the opposite sides of the first and second honeycomb layers, wherein bonding comprises applying pressure to at least one of the structural layers in a direction that is normal to a major surface of the structural layers and heating the structural layers and the first and second honeycomb layers.

14. The method of claim 11, further comprising defining at least one opening in the structural layer subsequent to applying the structural layer on opposite sides of the first honeycomb layer and the second honeycomb layer.

15. A method of fabricating a vented cell structure, comprising:
providing a first honeycomb layer comprising a plurality of first cell walls to define a plurality of first cells, and a second honeycomb layer comprising a plurality of second cells walls to define a plurality of second cells;
applying an adhesive to at least one of the plurality of first cell walls and second cell walls;
positioning the first and second honeycomb layers in contact with one another without aligning the plurality of first cells and the plurality of second cells, wherein positioning the first and second honeycomb layers comprises at least partially positioning the first honeycomb layer in a separate plane than the second honeycomb layer, and wherein positioning the first and second honeycomb layers comprises adhesively connecting the first honeycomb layer and the second honeycomb layer only at intersections of the plurality of first cell walls and the plurality of second cell walls without other obstruction between said first honeycomb layer and said second honeycomb layer, such that fluid can flow without obstruction between the plurality of first cells and the plurality of second cells;

applying a structural layer to the opposite sides of the first and second honeycomb layers, wherein the structural layer defines at least one opening aligned with at least one of the plurality of first cells and at least one of the plurality of second cells; and bonding the first honeycomb layer to the second honeycomb layer after positioning the first and second honeycomb layers, wherein bonding comprises applying pressure to at least one of the first honeycomb layer and the second honeycomb layer in a direction that is normal to a major surface of the first and second honeycomb layers and heating the first and second honeycomb layers, wherein applying pressure comprises encasing the first and second honeycomb layers in an encasement and removing air from the encasement.

16. The method of claim 15, wherein encasing the first and second honeycomb layers comprises placing a film on an outward facing surface of at least one of the first and second honeycomb layers.

17. A method of fabricating a vented cell structure, comprising:

providing a first honeycomb layer comprising a plurality of first cell walls to define a plurality of first cells, and a second honeycomb layer comprising a plurality of second cells walls to define a plurality of second cells;

applying an adhesive to at least one of the plurality of first cell walls and second cell walls;

positioning the first and second honeycomb layers in contact with one another without aligning the plurality of first cells and the plurality of second cells, wherein positioning the first and second honeycomb layers comprises at least partially positioning the first honeycomb layer in a separate plane than the second honeycomb layer, and wherein positioning the first and second honeycomb layers comprises adhesively connecting the first honeycomb layer and the second honeycomb layer only at intersections of the plurality of first cell walls and the plurality of second cell walls without other obstruction between said first honeycomb layer and said second honeycomb layer, such that fluid can flow without obstruction between the plurality of first cells and the plurality of second cells;

applying a structural layer to the opposite sides of the first and second honeycomb layers, wherein the structural layer defines at least one opening aligned with at least one of the plurality of first cells and at least one of the plurality of second cells; and bonding the structural layer to opposite sides of the first and second honeycomb layers, and bonding the first honeycomb layer to the second honeycomb layer after applying the structural layer to the opposite sides of the first and second honeycomb layers, wherein bonding comprises applying pressure to at least one of the structural layers in a direction that is normal to a major surface of the structural layers and heating the structural layers and the first and second honeycomb layers, wherein applying pressure comprises encasing the structural layers and the first and second honeycomb layers in an encasement and removing air from the encasement.

18. The method of claim 17, wherein encasing the structural layers and the first and second honeycomb layers comprises placing a film on an outward facing surface of at least one of the structural layers.

19. A method of fabricating a vented cell structure, comprising:

providing a first honeycomb layer comprising a plurality of first cell walls to define a plurality of first cells, and a second honeycomb layer comprising a plurality of second cells walls to define a plurality of second cells;

applying an adhesive to at least one of the plurality of first cell walls and second cell walls;

positioning the first and second honeycomb layers in contact with one another without aligning the plurality of first cells and the plurality of second cells, wherein positioning the first and second honeycomb layers comprises at least partially positioning the first honeycomb layer in a separate plane than the second honeycomb layer, and wherein positioning the first and second honeycomb layers comprises adhesively connecting the first honeycomb layer and the second honeycomb layer only at intersections of the plurality of first cell walls and the plurality of second cell walls without other obstruction between said first honeycomb layer and said second honeycomb layer, such that fluid can flow without obstruction between the plurality of first cells and the plurality of second cells; and applying a structural layer to the opposite sides of the first and second honeycomb layers, wherein the structural layer defines at least one opening aligned with at least one of the plurality of first cells and at least one of the plurality of second cells, wherein positioning the first and second honeycomb layer comprises applying pressure to at least one of the first and second honeycomb layer such that edges of at least one of the plurality of first cell walls and the plurality of second cell walls partially cut into one another.

20. A method of fabricating a vented cell structure, comprising:

providing a first honeycomb layer comprising a plurality of first cell walls to define a plurality of first cells, and a second honeycomb layer comprising a plurality of second cells walls to define a plurality of second cells;

applying an adhesive to at least one of the plurality of first cell walls and second cell walls;

positioning the first and second honeycomb layers in contact with one another without aligning the plurality of first cells and the plurality of second cells, wherein positioning the first and second honeycomb layers comprises at least partially positioning the first honeycomb layer in a separate plane than the second honeycomb layer, and wherein positioning the first and second honeycomb layers comprises adhesively connecting the first honeycomb layer and the second honeycomb layer only at intersections of the plurality of first cell walls and the plurality of second cell walls without other obstruction between said first honeycomb layer and said second honeycomb layer, such that fluid can flow without obstruction between the plurality of first cells and the plurality of second cells;

applying a structural layer to the opposite sides of the first and second honeycomb layers, wherein the structural layer defines at least one opening aligned with at least one of the plurality of first cells and at least one of the plurality of second cells; and rotating the first honeycomb layer relative to the second honeycomb layer prior to positioning the first and second honeycomb layers.

21. A vented cell structure, comprising:

a first honeycomb layer comprising a plurality of first cell walls to define a plurality of first cells;

a second honeycomb layer adjacent and connected to said first honeycomb layer and comprising a plurality of second cell walls to define a plurality of second cells, wherein said first honeycomb layer and said second honeycomb layer are positioned such that the plurality of first cells and the plurality of second cells are misaligned, wherein said first honeycomb layer is positioned at least partially in a separate plane than said second honeycomb layer, and wherein the first honeycomb layer and second honeycomb layer are connected only at intersections of the plurality of first cell walls and the plurality of second cell walls without other obstruction between said first honeycomb layer and said second honeycomb layer, such that fluid can flow without obstruction between the plurality of first cells and the plurality of second cells; and a structural layer on opposite sides of said first honeycomb layer and said second honeycomb layer, wherein said structural layer defines at least one opening aligned with at least one of the first cells and at least one of the second cells, to thereby create the vented cell structure, wherein the plurality of first cell walls of said first honeycomb layer and the plurality of second cell walls of said second honeycomb layer partially cut into one another.

22. A vented cell structure, comprising:

a first honeycomb layer comprising a plurality of first cell walls to define a plurality of first cells;

a second honeycomb layer adjacent and connected to said first honeycomb layer and comprising a plurality of second cell walls to define a plurality of second cells, wherein said first honeycomb layer and said second honeycomb layer are positioned such that the plurality of first cells and the plurality of second cells are misaligned, wherein said first honeycomb layer is positioned at least partially in a separate plane than said second honeycomb layer, and wherein the first honeycomb layer and second honeycomb layer are connected only at intersections of the plurality of first cell walls and the plurality of second cell walls without other obstruction between said first honeycomb layer and said second honeycomb layer, such that fluid can flow without obstruction between the plurality of first cells and the plurality of second cells; and a structural layer on opposite sides of said first honeycomb layer and said second honeycomb layer, wherein said structural layer defines at least one opening aligned with at least one of the first cells and at least one of the second cells, to thereby create the vented cell structure, wherein said first honeycomb layer is rotated relative to said second honeycomb layer.

* * * * *